US011965632B2

(12) United States Patent
Mandl et al.

(10) Patent No.: US 11,965,632 B2
(45) Date of Patent: Apr. 23, 2024

(54) LIGHTING DEVICE FOR A MOTOR VEHICLE HEADLAMP

(71) Applicant: ZKW Group GmbH, Wieselburg (AT)

(72) Inventors: Bernhard Mandl, Ober-Grafendorf (AT); Andreas Hölzl, Wieselburg (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/026,323

(22) PCT Filed: Jul. 22, 2021

(86) PCT No.: PCT/EP2021/070587
§ 371 (c)(1),
(2) Date: Mar. 14, 2023

(87) PCT Pub. No.: WO2022/063459
PCT Pub. Date: Mar. 31, 2022

(65) Prior Publication Data

US 2023/0358385 A1 Nov. 9, 2023

(30) Foreign Application Priority Data

Sep. 25, 2020 (EP) .................................... 20198393

(51) Int. Cl.
*F21S 41/40* (2018.01)
*F21S 41/147* (2018.01)
*F21S 41/265* (2018.01)

(52) U.S. Cl.
CPC ............. *F21S 41/40* (2018.01); *F21S 41/147* (2018.01); *F21S 41/265* (2018.01)

(58) Field of Classification Search
CPC ......... F21S 41/40; F21S 41/265; F21S 41/147
(Continued)

(56) References Cited

U.S. PATENT DOCUMENTS

2002/0196639 A1 12/2002 Weidel
2005/0190572 A1 9/2005 Komatsu et al.
(Continued)

FOREIGN PATENT DOCUMENTS

DE 102004008296 A1 9/2005
JP 2013186951 A 9/2013

OTHER PUBLICATIONS

International Search Report for PCT/EP2021/070587 dated Oct. 7, 2021 (13 pages).
(Continued)

*Primary Examiner* — Laura K Tso
(74) *Attorney, Agent, or Firm* — Eversheds Sutherland (US) LLP

(57) ABSTRACT

Illumination device (10) for a motor vehicle headlight, which comprises the following:

Figure 1:
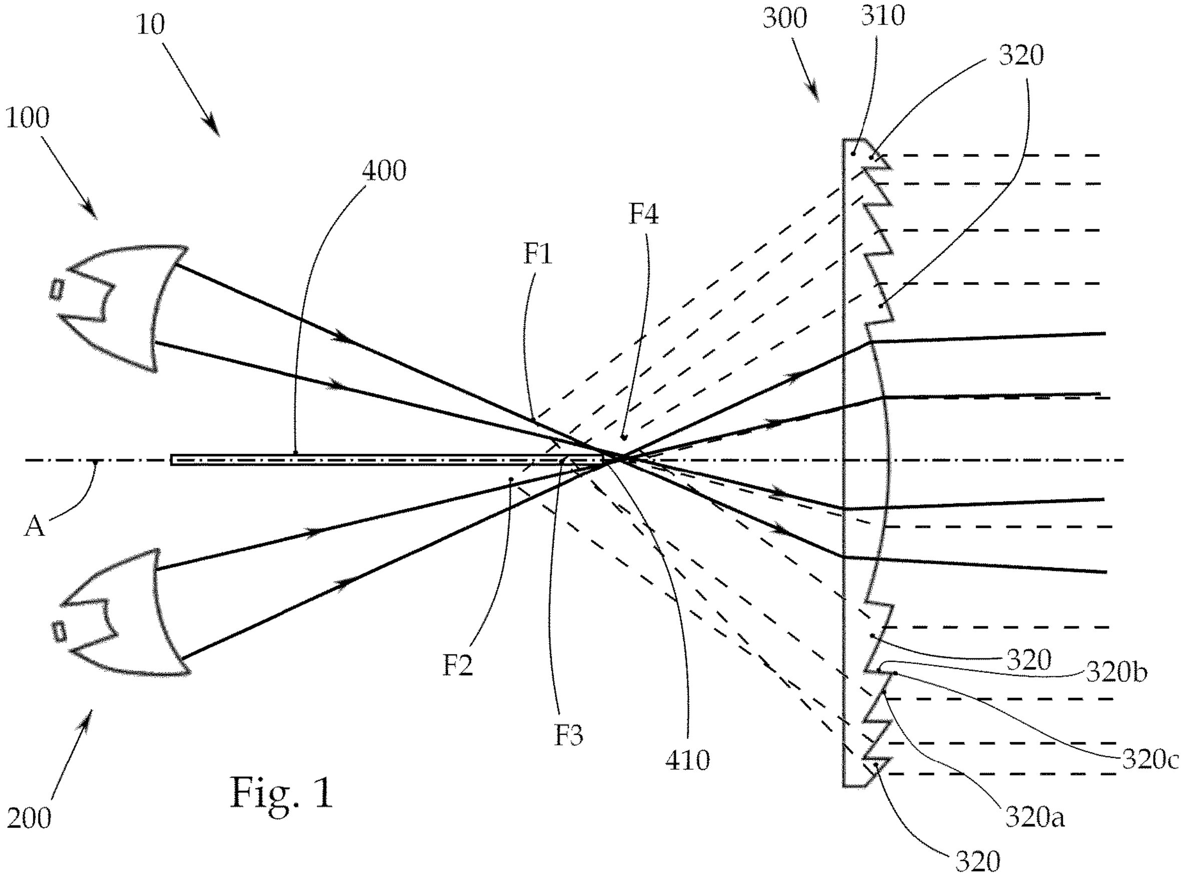

a first light module (100) for producing light distribution,
a bulb shield (300) having a bulb shield (300), which comprises an optically relevant shield edge (310) for producing a cut-off line,
a projection lens (400) with an optical axis (A), which is designed to image the light that can be produced by the first light module (100) in front of the illumination device (10), wherein the projection lens (400) is designed as a Fresnel lens, which Fresnel lens has a base body (410) and several annular steps (420) arranged on the base body (410), wherein each step (420) has a main surface (**420*a*) to project the light beams of the at least one light module (100) in front of the illumination device (10) and a sloping surface (420*b*) extending from the base body (410) to the main surface (420*a***), wherein the main surface of each step is curved and has a focal point, which focal point is arranged horizontally and/or vertically displaced from (Continued)

the optical axis of the Fresnel lens, and wherein adjacent steps have different focal points from one another.

9 Claims, 1 Drawing Sheet

(58) Field of Classification Search
USPC ........................................ 362/539, 522, 520
See application file for complete search history.

(56) References Cited

U.S. PATENT DOCUMENTS

| | | | | |
|---|---|---|---|---|
| 2006/0250811 | A1* | 11/2006 | Wu | F21V 13/12<br>362/520 |
| 2009/0213608 | A1 | 8/2009 | Mozaffari-Afshar et al. | |
| 2011/0205748 | A1 | 8/2011 | Yatsuda | |
| 2019/0195455 | A1* | 6/2019 | Chen | F21S 41/275 |
| 2023/0313962 | A1* | 10/2023 | Mandl | F21S 41/255<br>362/521 |

OTHER PUBLICATIONS

Search Report for European Patent Application No. 20198393.9 dated Mar. 17, 2021 (22 pages).

* cited by examiner

LIGHTING DEVICE FOR A MOTOR VEHICLE HEADLAMP

The invention relates to an illumination device for a motor vehicle headlight, which illumination device comprises the following:

- at least one first light module having at least one light source to produce light distribution in the direction of a main emission direction, wherein the light module is designed to emit light beams in a main emission direction,
- a projection lens with an optical axis, which is designed to image the light that can be produced by the first light module in front of the illumination device, wherein the projection lens is designed as a Fresnel lens, which Fresnel lens has a base body and several annular steps arranged on the base body, which steps are arranged substantially concentrically to one another, wherein each step has a main surface to project the light beams of the at least one light module in front of the illumination device and a sloping surface extending from the base body to the main surface,
- a bulb shield, wherein the bulb shield comprises an optically relevant shield edge for producing a cut-off line, wherein the shield edge intersects the optical axis of the Fresnel lens, and wherein the first light module is arranged on an upper side of the bulb shield and cooperates in combination with the optically relevant shield edge of the bulb shield to produce light distribution.

Furthermore, the invention relates to a motor vehicle headlight having at least one illumination device according to the invention.

A Fresnel lens (more precisely: a Fresnel stepped lens) is an optical lens, which enables the design of large and thick lenses with a short focal length without the weight and volume of conventional lenses.

The reduction in volume in the Fresnel lens occurs as a result of a division into annular areas. The thickness is reduced in each of these areas giving the lens a series of annular steps. Given that light is only refracted at the main surface of the lens, the angle of refraction is not dependent on the thickness, but rather on the angle between the two surfaces of a lens. The lens therefore retains its optical properties although the image quality is negatively impacted by the step structure, but this does not matter in many applications. Examples of this are illumination beam paths for all types of headlights.

It is an object of the invention to provide an improved illumination device.

This object is achieved by virtue of the fact that the main surface of each step is curved and has at least one focal point, which focal point is arranged horizontally and/or vertically displaced from the optical axis of the Fresnel lens, and wherein adjacent steps have different focal points from one another.

It can, for example, be provided that each step or the main surface of the step has several sections, which can each have different focal points. It can, for example, be provided that—when seen in an installation position of the illumination device in a motor vehicle headlight—the upper half of a step has a different focal point to a lower half of the step.

When distributing, for example, two focal points, one above and one below the optical axis in a vertical direction or the shield edge, two light images are produced, which are arranged offset from each other in a vertical direction. The same applies to focal points offset from each other in a horizontal direction, with the light images being offset from each other in a horizontal direction. Overlapping the offset light images on top of each other results in a blur, which is advantageous when compensating for colour effects in the cut-off line and when softening the cut-off line.

A shift of the light distributions of approx. 1/10° up to several tenths of a degree in the horizontal and/or vertical direction—measured on an aiming screen that meets the legal requirements (for example, aiming screen within the meaning of the ECE guidelines)—can be provided.

The term “optical axis” means the optical axis that, on the one hand, also constitutes an axis of symmetry of the Fresnel lens, i.e. intersects the Fresnel lens substantially at its centre or midpoint.

In general, the terms used in the following relating to a location or an orientation, such as “horizontal”, “vertical”, “in a horizontal direction”, “in a vertical direction”, “top”, “bottom”, in front of“, “behind”, “below”, “above” etc. refer to a correct installation position of the projection module in question in a motor vehicle headlight.

It should also be noted that the phrase “arranged horizontally and/or vertically displaced” includes a displacement in a horizontal plane or a vertical plane, i.e. the focal points can also be arranged displaced along or in the direction of the optical axis.

It can be provided that the bulb shield has a longitudinal axis, wherein the longitudinal axis of the bulb shield is arranged in a horizontal plane in an installed state of the illumination device in a motor vehicle headlight, and wherein the optically relevant shield edge is designed to produce an asymmetrical cut-off line, and wherein the first light module cooperates in combination with the optically relevant shield edge of the bulb shield to produce dipped beam distribution.

It can be provided that the illumination device comprises at least one second light module having at least one light source to produce full beam distribution.

The dipped beam distribution and the full beam distribution switched on, for example, form an overall light distribution, wherein a potential gap between these light distributions is also projected out of focus due to the shifted focal points, whereby the resulting gap between the dipped beam distribution and full beam distribution is closed.

It can be provided that the second light module is arranged on a lower side of the bulb shield.

It can be provided that the main surface of the steps is convex or concave.

It can be provided that the main surface and the sloping surface of a step form a step edge in a common surface section line, wherein the step edges are spaced from adjacent step edges by a distance smaller than 20 μm, preferably smaller than 10 μm, preferably smaller than 5 μm.

The object is also achieved by a motor vehicle headlight having at least one illumination device according to the invention.

The invention is explained below in more detail based on exemplary drawings. In the drawings, FIG. 1 shows a side view of an exemplary illumination device having a projection lens designed as a Fresnel lens, wherein the Fresnel lens comprises several steps that are substantially concentric with each other, and FIG. 2 shows a cross-sectional view of a step of the Fresnel lens from FIG. 1.

FIG. 1 shows an exemplary illumination device 10 for a motor vehicle headlight, which illumination device comprises a first light module 100 having at least one light source to produce dipped beam distribution in the direction of a main emission direction, wherein the first light module 100 is designed to emit light beams in a main emission direction.

Furthermore, the illumination device 10 comprises a projection lens 300 with an optical axis A, which projection lens 300 is designed to image the light that can be produced by the first light module 100 in front of the illumination device 10, wherein the projection lens 300 is designed as a Fresnel lens.

Figure 2:
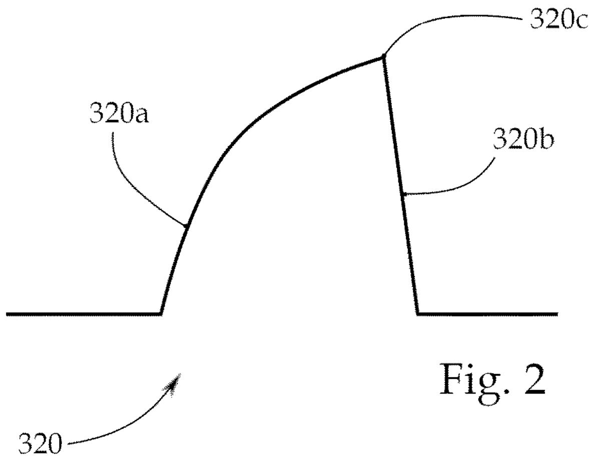

The Fresnel lens comprises a base body 310 and several annular steps 320 arranged on the base body 310, which steps 320 are arranged substantially concentrically to one another, wherein each step 320 has a main surface 320*a* to project the light beams of the at least one light module 100 in front of the illumination device 10 and a sloping surface 320*b* extending from the base body 310 to the main surface 320*a*, as shown more clearly in FIG. 2.

Moreover, the main surface 320*a* and the sloping surface 320*b* of a step 320 form a step edge 320*c* in a common surface section line, wherein the step edges 320*c* are spaced from adjacent step edges 320*c* by a distance smaller than 20 μm, preferably smaller than 10 μm, preferably smaller than 5 μm.

Furthermore, the illumination device 10 comprises a bulb shield 400 with a longitudinal axis, wherein the longitudinal axis of the bulb shield 400 is arranged in a horizontal plane in an installed state of the illumination device 100 in a motor vehicle headlight, wherein the bulb shield 400 comprises an optically relevant shield edge 410 for producing an asymmetrical cut-off line, wherein the shield edge 410 intersects the optical axis A of the Fresnel lens.

The first light module 100 is arranged on an upper side of the bulb shield and cooperates in combination with the optically relevant shield edge 410 of the bulb shield 400 to produce dipped beam distribution.

In general, the terms used in the following relating to a location or an orientation, such as "horizontal", "vertical", "in a horizontal direction", "in a vertical direction", "top", "bottom", in front of", "behind", "below", "above" etc. refer to a correct installation position of the illumination device in question in a motor vehicle headlight.

The main surface 320*a* of each step 320 is curved and respectively has a focal point F1, F2, F3, F4, which focal point F1, F2, F3, F4 is arranged horizontally and/or vertically displaced from the optical axis A of the Fresnel lens, and wherein adjacent steps 320 have different focal points F1, F2, F3, F4 from one another.

As shown in FIG. 1, a focal point F1 is assigned to the outermost step of the Fresnel lens, a focal point F2 to the next inner step and so on.

The curved main surfaces 320*a* of the steps can be convex or concave; in FIG. 2, the exemplary step is formed with a convex main surface 320*a*.

Furthermore, the exemplary illumination device from FIG. 1 comprises a second light module 200 having at least one light source to produce full beam distribution, wherein the second light module 200 is arranged on a lower side of the bulb shield 400.

REFERENCE LIST

Illumination device . . . 10
First light module . . . 100
Second light module . . . 200
Projection lens . . . 300
Base body . . . 310
Step . . . 320
Main surface . . . 320*a*
Sloping surface . . . 320*b*
Step edge . . . 320*c*
Bulb shield . . . 400
Shield edge . . . 410
Focal point . . . F1, F2, F3, F4

The invention claimed is:

1. An illumination device (10) for a motor vehicle headlight, the illumination device (10) comprising:

at least one first light module (100) having at least one light source to produce light distribution in a direction of a main emission direction, wherein the first light module (100) is designed to emit light beams in a main emission direction;

a projection lens (300) with an optical axis (A), which projection lens (300) is designed to image a light that can be produced by the first light module (100) in front of the illumination device (10), wherein the projection lens (300) is designed as a Fresnel lens, which Fresnel lens has a base body (310) and several annular steps (320) arranged on the base body (310), which steps (320) are arranged substantially concentrically to one another, wherein each step (320) has a main surface (320*a*) to project the light beams of the at least one first light module (100) in front of the illumination device (10) and a sloping surface (320*b*) extending from the base body (310) to the main surface (320*a*); and a bulb shield (400), wherein the bulb shield (400) comprises an optically relevant shield edge (410) for producing a cut-off line, wherein the optically relevant shield edge (410) intersects the optical axis (A) of the Fresnel lens, and wherein the first light module (100) is arranged on an upper side of the bulb shield and cooperates in combination with the optically relevant shield edge (410) of the bulb shield (400) to produce light distribution, wherein the main surface (320*a*) of each step (320) is curved and has at least one focal point (F1, F2, F3, F4), which focal point (F1, F2, F3, F4) is arranged at least one of horizontally displaced from the optical axis (A) of the Fresnel lens or vertically displaced from the optical axis (A) of the Fresnel lens, and wherein adjacent steps (320) have different focal points (F1, F2, F3, F4) from one another.

2. The illumination device according to claim 1, wherein the bulb shield has a longitudinal axis, wherein the longitudinal axis of the bulb shield (400) is arranged in a horizontal plane in an installed state of the illumination device (100) in a motor vehicle headlight, and wherein the optically relevant shield edge is designed to produce an asymmetrical cut-off line, and wherein the first light module (100) cooperates in combination with the optically relevant shield edge (410) of the bulb shield (400) to produce dipped beam distribution.

3. The illumination device according to claim 1, wherein the illumination device (10) comprises at least one second light module (200) having at least one light source to produce full beam distribution.

4. The illumination device according to claim 3, wherein the second light module (200) is arranged on a lower side of the bulb shield (400).

5. The illumination device according to claim 1, wherein the main surface (320*a*) of the steps (320*a*) is convex or concave.

6. The illumination device according to claim 1, wherein the main surface (320*a*) and the sloping surface (320*b*) of a step (320) form a step edge (320*c*) in a common surface section line, wherein the step edges (320*c*) are spaced from adjacent step edges (320*c*) by a distance less than 20 μm.

7. A motor vehicle headlight having at least one illumination device (10) in accordance with claim 1.

8. The illumination device according to claim 6, wherein the step edges (320*c*) are spaced from adjacent step edges (320*c*) by a distance less than 10 μm.

9. The illumination device according to claim 6, wherein the step edges (320*c*) are spaced from adjacent step edges (320*c*) by a distance less than 5 μm.

* * * * *